US 12,122,521 B2
(12) United States Patent
Pacheco et al.

(10) Patent No.: US 12,122,521 B2
(45) Date of Patent: Oct. 22, 2024

(54) OFFSET HELICOPTER PILOT SEAT WITH CENTERED VERTICAL MOTION SYSTEM

(71) Applicant: AMI Industries, Inc., Colorado Springs, CO (US)

(72) Inventors: Chad Pacheco, Colorado Springs, CO (US); Douglas E. Hoover, Colorado Springs, CO (US); Troy L Brodish, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 76 days.

(21) Appl. No.: 17/966,228

(22) Filed: Oct. 14, 2022

(65) Prior Publication Data

US 2024/0124145 A1    Apr. 18, 2024

(51) Int. Cl.
*B64D 11/06* (2006.01)

(52) U.S. Cl.
CPC ...... *B64D 11/0689* (2013.01); *B64D 11/0619* (2014.12)

(58) Field of Classification Search
CPC ... B64D 11/06; B64D 11/0639; B64D 11/064; B64D 11/0689; B64D 11/0619; B64D 25/04
See application file for complete search history.

(56) References Cited

U.S. PATENT DOCUMENTS

| 4,625,934 A | 12/1986 | Ryan et al. |
| 7,497,413 B2 | 3/2009 | Pooschen |
| 8,408,643 B2 | 4/2013 | Honnorat |
| 8,550,224 B2 | 10/2013 | Bauer |
| 8,550,553 B1 | 10/2013 | Clark et al. |
| 2007/0095976 A1* | 5/2007 | Bietenhader ............ B64C 25/00 244/102 A |
| 2008/0015753 A1 | 1/2008 | Wereley et al. |
| 2013/0038099 A1 | 2/2013 | Mindel et al. |
| 2014/0361586 A1* | 12/2014 | Fornecker .............. B64D 11/06 297/216.1 |

(Continued)

FOREIGN PATENT DOCUMENTS

| EP | 2794396 B1 | 10/2014 |
| EP | 2813430 A1 | 12/2014 |

(Continued)

OTHER PUBLICATIONS

European Search Report dated Feb. 23, 2024; European Application No. 23203848.9.

*Primary Examiner* — Brady W Frazier
*Assistant Examiner* — Shanna Danielle Glover
(74) *Attorney, Agent, or Firm* — Suiter Swantz IP

(57) ABSTRACT

In one aspect, the present disclosure provides a rotorcraft pilot seat including a seat base attachable to floor tracks, a seat bucket positioned laterally offset relative to a centerline of the seat base, and a singular motion controller movably coupling the seat bucket to the seat base, wherein the singular motion controller is centered relative to the seat bucket and laterally offset relative to the seat base. In another aspect, the present disclosure provides a rotorcraft cockpit configuration including a floor defining a well configured to receive retracted landing gear, a pilot seat positioned to one lateral side of the well, and a copilot seat positioned to an opposing lateral side of the well, each seat including an offset configuration.

13 Claims, 8 Drawing Sheets

(56) References Cited

U.S. PATENT DOCUMENTS

2017/0313215 A1* 11/2017 Akutsu ................ B60N 2/3047

FOREIGN PATENT DOCUMENTS

| EP | 3197709 | B1 | 8/2017 |
| EP | 3165401 | B1 | 2/2020 |
| EP | 4177163 | A1 | 5/2023 |
| WO | 2007093283 | A1 | 8/2007 |
| WO | 2010114966 | A1 | 10/2010 |

* cited by examiner

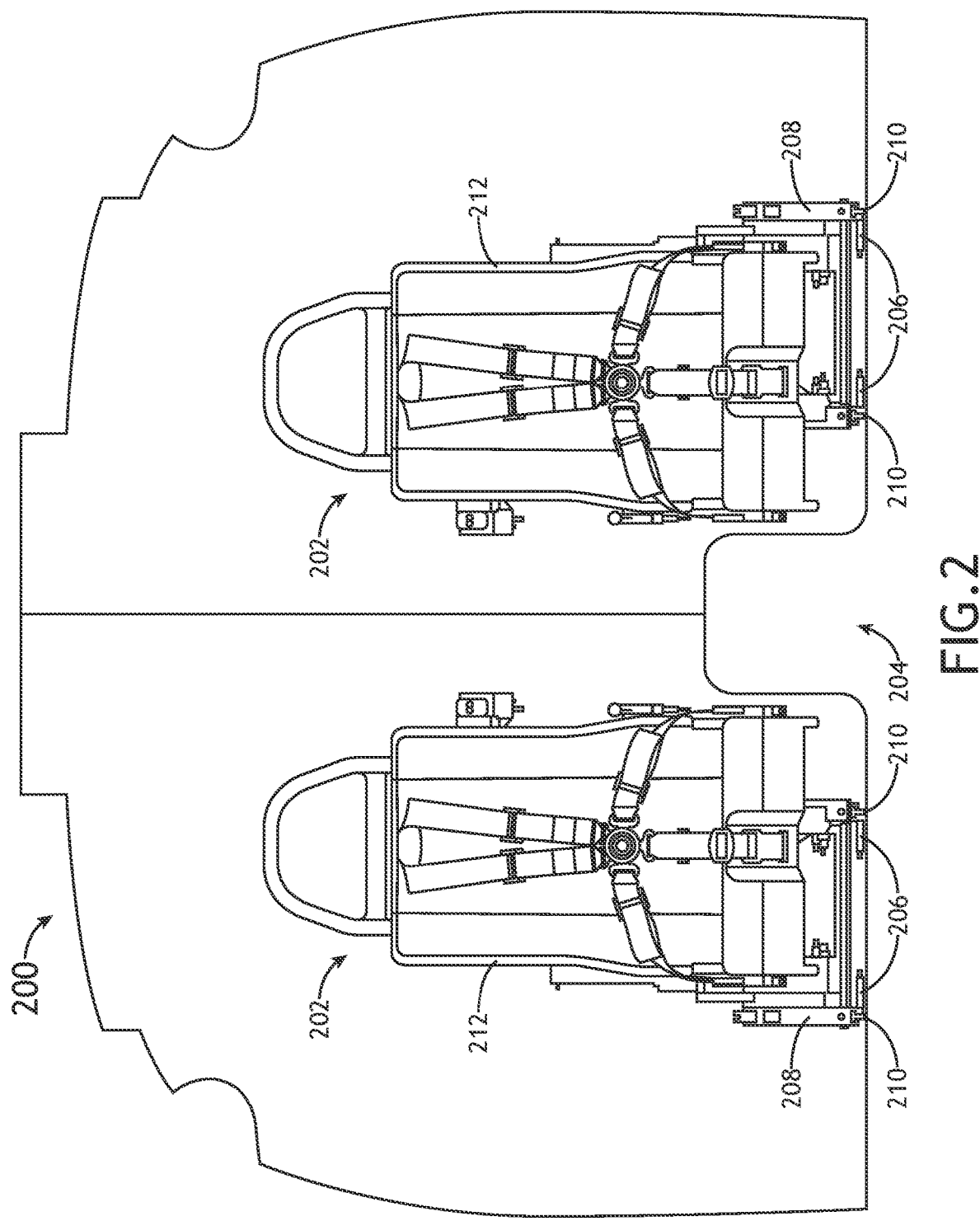

OFFSET HELICOPTER PILOT SEAT WITH CENTERED VERTICAL MOTION SYSTEM

TECHNICAL FIELD AND BACKGROUND

The present disclosure relates generally to pilot seats in rotorcraft such as helicopters, and more particularly to an asymmetric pilot seat including a centered motion control system.

Pilot and copilot seats in rotorcraft such as helicopters are required to stroke generally along a vertical motion path to protect the occupant's spine during a dynamic event such as a crash, extreme turbulence, and high flight gust loads. Vertical motion typically occurs between a seat base attached to the cockpit floor and a seat bucket movably coupled to the seat base. In use, during a g-force event of sufficient magnitude to cause stroking, the seat bucket translates relative to the seat base, and in some cases the motion path includes a combination of linear motion and rotational motion.

Certain cockpit configurations position the pilot and copilot seats laterally adjacent to each other, sometimes separated by a center console. FIG. 1 illustrates a conventional pilot or copilot seat 100. The seat 100 generally includes a seat base 102 and a seat bucket 104 movably coupled to the seat base 102. The seat base 102 generally includes spaced left and right stanchions 106. Track fasteners provided proximate the bottom end of each stanchion 106 may be used to secure the seat base 102 to the deck, for instance to spaced floor tracks.

As shown in FIG. 1, the seat bucket 104 is symmetrically positioned relative to the seat base 102, and in particular, symmetrically positioned between the spaced left and right stanchions 106. Each of the left and right stanchions 106 (e.g., outboard and inboard stanchions) attaches to a floor track such that the seat bucket 104 is therefore also symmetrically positioned relative to the spaced floor tracks. Although not shown, the seat 100 typically includes symmetrically positioned left and right motion assemblies facilitating seat bucket motion to allow height adjustment and also movement during a dynamic event. Each motion assembly, one positioned on each lateral side of the seat 100, interacts with the seat bucket and adjacent stanchion to facilitate seat bucket motion. In a symmetrical seat, the two assemblies work together to share the load and provide even seat bucket motion.

While a symmetrical pilot seat is suitable for use in some cockpit configurations, other cockpits require a different pilot seat solution. For example, some compact flight decks require dedicated space in the floor between the pilot seats for stowing retractable landing gear, and therefore require a seat bucket that is offset relative to the attachment points in the floor. The present inventors have found that in an offset pilot seat, in which the seat bucket is shifted laterally relative to the seat base, the two motion assemblies tend to compete and bind during stroking, resulting in an uneven vertical movement and uneven energy attenuation performance.

Therefore, what is needed is a seat motion solution for offset pilot seats.

BRIEF SUMMARY

In one aspect, the present disclosure provides a pilot seat for a rotorcraft such as a helicopter. The pilot seat includes a seat base attachable to floor tracks, a seat bucket positioned laterally offset relative to a centerline of the seat base, and a singular motion controller movably coupling the seat bucket to the seat base, wherein the singular motion controller is centered relative to the seat bucket and laterally offset relative to the seat base.

In some embodiments, the seat base includes spaced first and second vertical stanchions, a third vertical stanchion positioned between the first and second vertical stanchions, a first transverse spreader coupled to each of the first and third vertical stanchions, a second transverse spreader coupled to each of the second and third vertical stanchions, and a transverse floor pan coupled to each of the transverse spreader and the first, second and third vertical stanchions. In some embodiments, at least the first and third vertical stanchions include a roller channel defining a motion path of the seat bucket.

In some embodiments, the singular motion controller includes a carrier assembly positioned between and movably coupled to the first and third stanchions, a carriage assembly coupled to the seat bucket, and an energy absorber coupled between the carrier assembly and the carriage assembly. During normal use of the seat, the energy absorber prevents relative motion between the carrier assembly and the carriage assembly. During a dynamic event of sufficient magnitude the energy absorber permits relative motion between the carrier assembly and the carriage assembly.

In some embodiments, the carrier assembly includes vertically oriented rollers engaged in and configured to roll along the roller channels of the first and third stanchions, and the carriage assembly includes vertically oriented rollers engaged in and configured to roll along the roller channels of the first and third stanchions.

In some embodiments, each of the carrier assembly and the carriage assembly is centered relative to the seat bucket.

In some embodiments, the seat further includes a gas spring coupled between the carrier assembly and the seat base, the gas spring operative to provide a lifting force on the carrier assembly and dampen downward motion of the carrier assembly relative to the seat base.

In some embodiments, the motion path of the seat bucket includes at least one of linear motion and rotational motion.

In some embodiments, the first transverse spreader includes a plurality of spaced apart and vertically aligned metering holes, and the carrier assembly carries a spring-loaded pin configured to be received in one of the plurality of metering holes at a time to lock a vertical position of the carrier assembly relative to the seat base.

In another aspect, the present disclosure provides a cockpit configuration for a rotorcraft such as a helicopter. The cockpit configuration includes a floor defining a well configured to receive retracted landing gear, a pilot seat attached to the floor and positioned on a first lateral side of the well, and a copilot seat attached to the floor and positioned on a second lateral side of the well. Each of the pilot seat and the copilot seat includes a seat base attached to the floor, a seat bucket positioned laterally offset relative to a centerline of the seat base, and a singular motion controller movably coupling the seat bucket to the seat base, wherein the singular motion controller is centered relative to the seat bucket and laterally offset relative to the seat base.

In some embodiments, the seat base includes spaced first and second vertical stanchions each attached to a floor track positioned in the floor, a third vertical stanchion positioned between the first and second vertical stanchions, the third vertical stanchion detached from the floor, a first transverse spreader coupled to each of the first and third vertical stanchions, a second transverse spreader coupled to each of the second and third vertical stanchions, and a transverse floor pan coupled to each of the transverse spreader and the first, second and third vertical stanchions. In some embodiments, at least the first and third vertical stanchions include a roller channel defining a motion path of the seat bucket.

In some embodiments, the singular motion controller includes a carrier assembly positioned between and movably coupled to the first and third stanchions, a carriage assembly coupled to the seat bucket, and an energy absorber coupled between the carrier assembly and the carriage assembly. During normal use of the seat, the energy absorber prevents relative motion between the carrier assembly and the carriage assembly, and during a dynamic event of sufficient magnitude the energy absorber permits relative motion between the carrier assembly and the carriage assembly.

In some embodiments, each of the carrier assembly and the carriage assembly is centered relative to the seat bucket, and the pilot seat and the copilot seat are offset in opposite directions.

This brief summary is provided solely as an introduction to subject matter that is fully described in the detailed description and drawings. This brief summary should not be considered to describe essential features nor be used to determine the scope of the claims. Moreover, it is to be understood that both the foregoing brief summary and the following detailed description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2 is a front view of a rotorcraft cockpit configuration, in accordance with an embodiment of this disclosure;

DETAILED DESCRIPTION OF THE INVENTION

Figure 1:
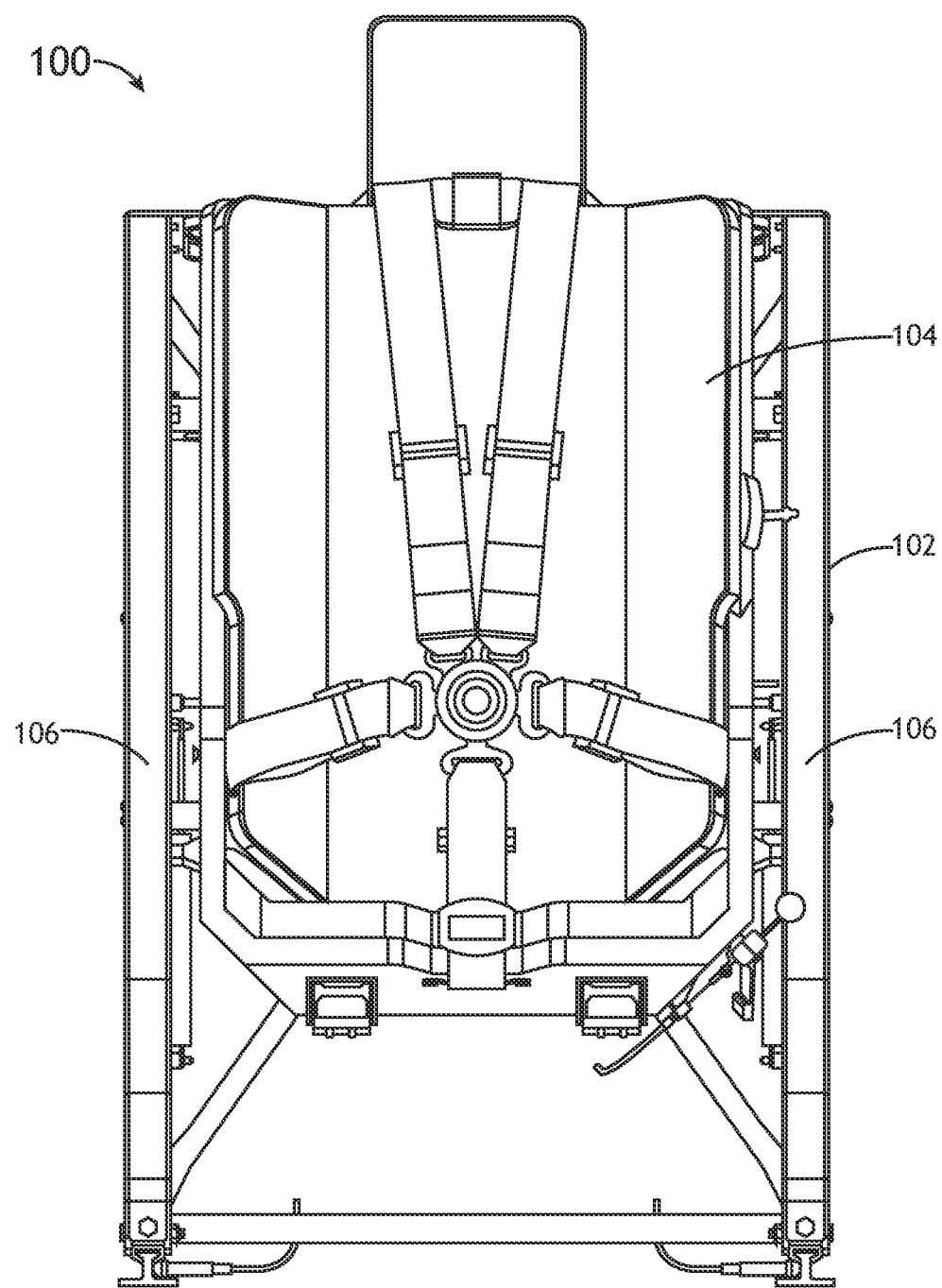
FIG. 1 is a front view of a prior art pilot seat in which the seat bucket is centered relative to the seat base (i.e., symmetrical and not offset)

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides a configuration of a pilot seat (or copilot seat) for a rotorcraft such as a helicopter, as well as a configuration for a rotorcraft cockpit such as a helicopter cockpit including a pilot seat and a copilot seat. The pilot seat, as well as the copilot seat, generally includes a seat base and a seat bucket movably coupled to the seat base. The seat bucket and the seat base are offset, meaning that the seat bucket is not centered relative to the seat base. More particularly, a portion of the seat bucket overhangs the seat frame in one lateral direction. The seat bucket is movably coupled to the seat base by a singular motion controller. The singular motion controller is centered relative to the seat bucket and consequently centered relative to the seat occupant. The singular motion controller is not centered relative to the seat base. In other words, the singular motion controller is laterally shifted toward one side of the seat frame in order to be centered relative to the offset seat bucket. In contrast to a symmetrical pilot seat configuration such as the non-limiting example shown in FIG. 1, the pilot seat according to the present disclosure includes symmetrical component relationship as well as asymmetrical component relationships, as discussed in detail below.

FIG. 2 illustrates a rotorcraft cockpit layout 200 in accordance with an embodiment of the present disclosure. The cockpit 200 generally includes a pilot seat and a copilot seat, both indicated at 202, positioned on opposite lateral sides of a well 204. In a non-limiting example, the well provides stowage space for retractable landing gear and affects the position of floor tracks 206 for attaching the seats. In some embodiments, the well 204 requires the floor tracks 206 to be moved laterally outward as compared to a cockpit configuration without a well. The seat bases 208 carrying track fasteners 210 require the track fasteners to be positioned directly above their respective floor track 206. Considering the cockpit dimensions and flight control positions, the seat buckets 212 are required to be positioned laterally inward relative to the seat bases 208. This outward seat base position and inward seat bucket position results in offset pilot and copilot seats in which the seat buckets are not centered relative to their respective seat base. In some embodiments, the cockpit is symmetrical about a vertical centerline.

Figure 3A:
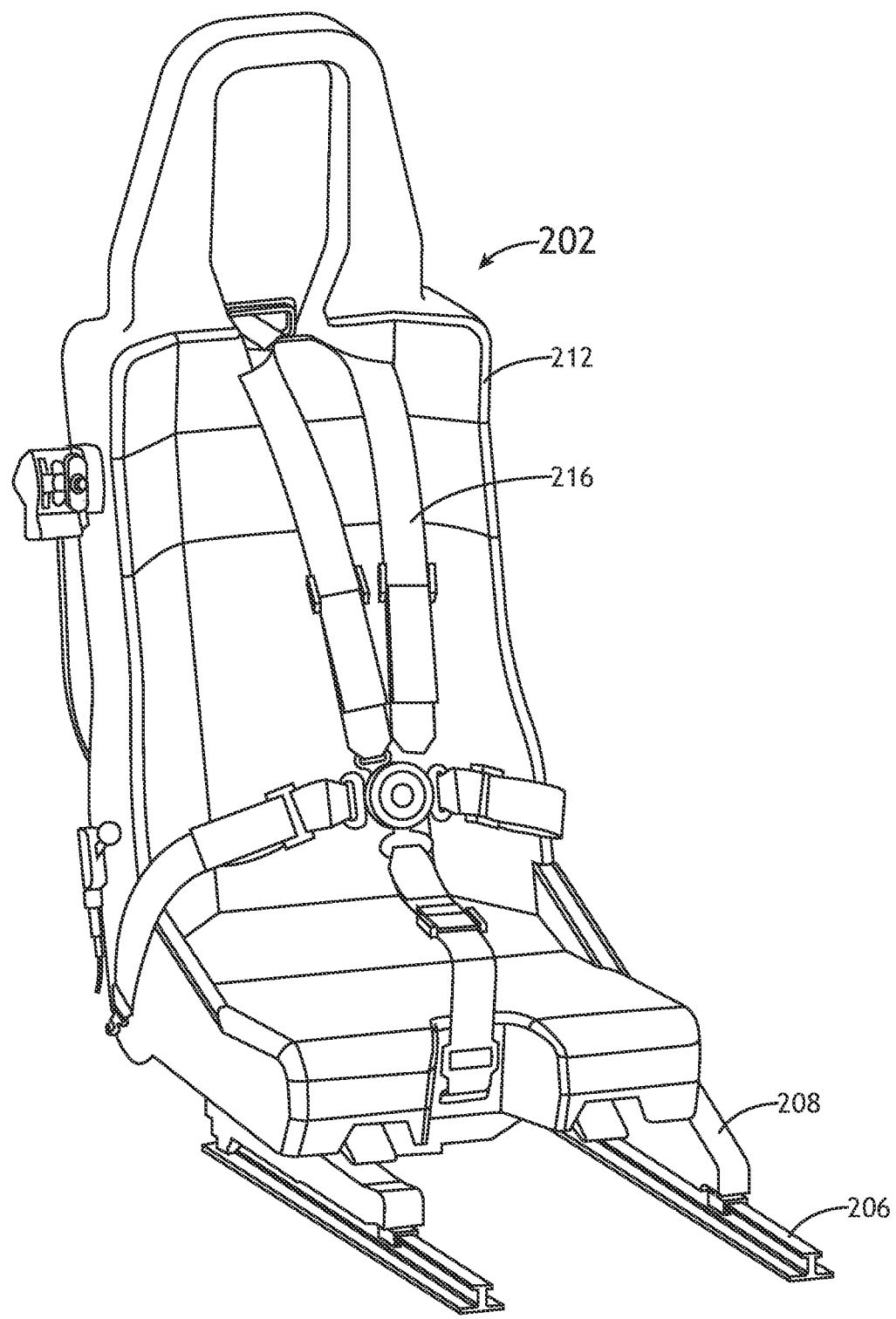
FIGS. 3A and 3B are front isometric views of an offset pilot seat emphasizing seat details, in accordance with an embodiment of this disclosure.

FIG. 3A illustrates one of the pilot and copilot seats shown in the cockpit layout illustrated in FIG. 2. The pilot or copilot seat, referred to herein simply as the seat 202, generally includes the seat base 208 and the seat bucket 212 movably coupled to the seat base. In some embodiments, the seat bucket 212 includes or forms a headrest 214. In some embodiments, the seat 202 further includes a passenger restraint 216 anchored to the seat bucket 212, for example implemented as the multi-point restraint shown. The seat base 208 is attached to the floor tracks 206. In some embodiments, the seat base 208 is configured to move longitudinally along the floor tracks to position the seat relative to the flight controls. In some embodiments, the seat base 208 is capable of longitudinal adjustment but incapable of lateral adjustment.

Figure 3B:
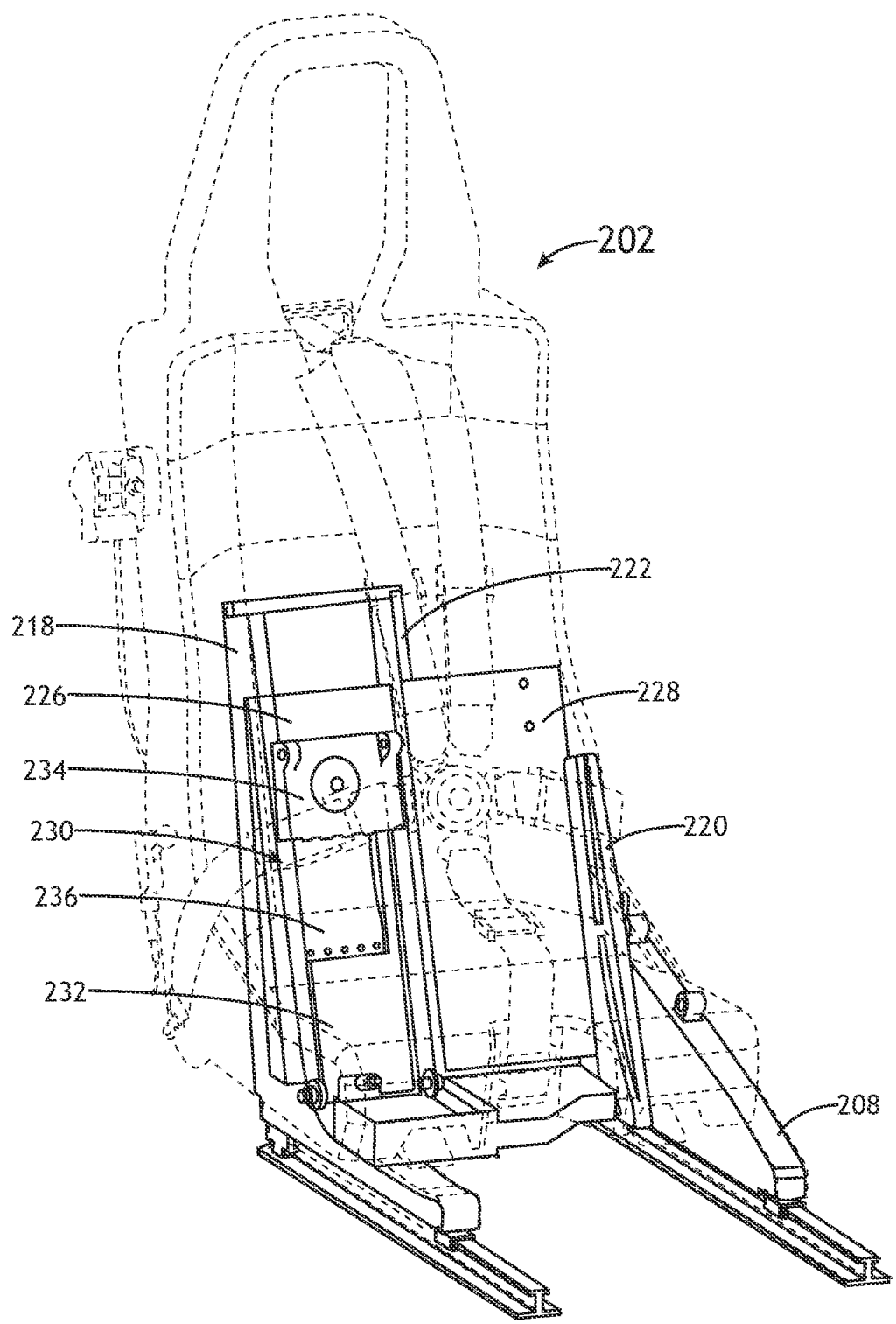

FIG. 3B illustrates the seat base 208 and associated singular motion controller 230. The seat base 208 generally includes a plurality of vertical stanchions interconnected through transverse frame members. As shown, the seat base 208 includes first and second stanchions 218 and 220 positioned at and defining the lateral extents of the seat base, and a third stanchion 222 positioned between and in spaced apart relation to each of the first and second stanchions. In some embodiments, the stanchions 218, 220, 222 are oriented substantially vertical and parallel. In some embodiments, the stanchions are inclined to provide a comfortable ergonomic sitting position.

The seat base 208 further includes a transverse floor pan 224, oriented substantially horizontal, extending substantially the width of the seat base 208 and coupled to each of the first, second and third stanchions 218, 220, 222. A first transverse spreader 226 is positioned between and coupled to each of the first and third stanchions 218, 222, and a second transverse spreader 228 is positioned between and coupled to each of the second and third stanchions 220, 222. As shown in the cockpit environment of FIG. 2, the first stanchion 218 may correspond to an inboard stanchion positioned closest to the cockpit centerline, the second stanchion 220 may correspond to an outboard station positioned closest the fuselage, and the third stanchion 222 may correspond to a center station centered between the first and second stanchions 218, 220 or closer to one of the stanchions as compared to the other, depending on the amount of offset of the seat bucket 212. In some embodiments, the first and third stanchions 218, 222 are longer in the vertical direction as compared to the second stanchion 220 considering the first and third stanchions support the singular motion controller as discussed below.

With continued reference to FIG. 3B, the singular motion controller 230 is positioned between and movably supported by the first and third stanchions 218, 222. In use, the singular motion controller 230, referred to herein simply as the motion controller, is operative to change the seat bucket position relative to the seat base 208 and also act in a specific manner during a dynamic event as discussed further below. The motion controller 230 generally includes a carrier assembly 232 and a carriage assembly 234 interconnected by an energy absorber 236.

Figure 4:
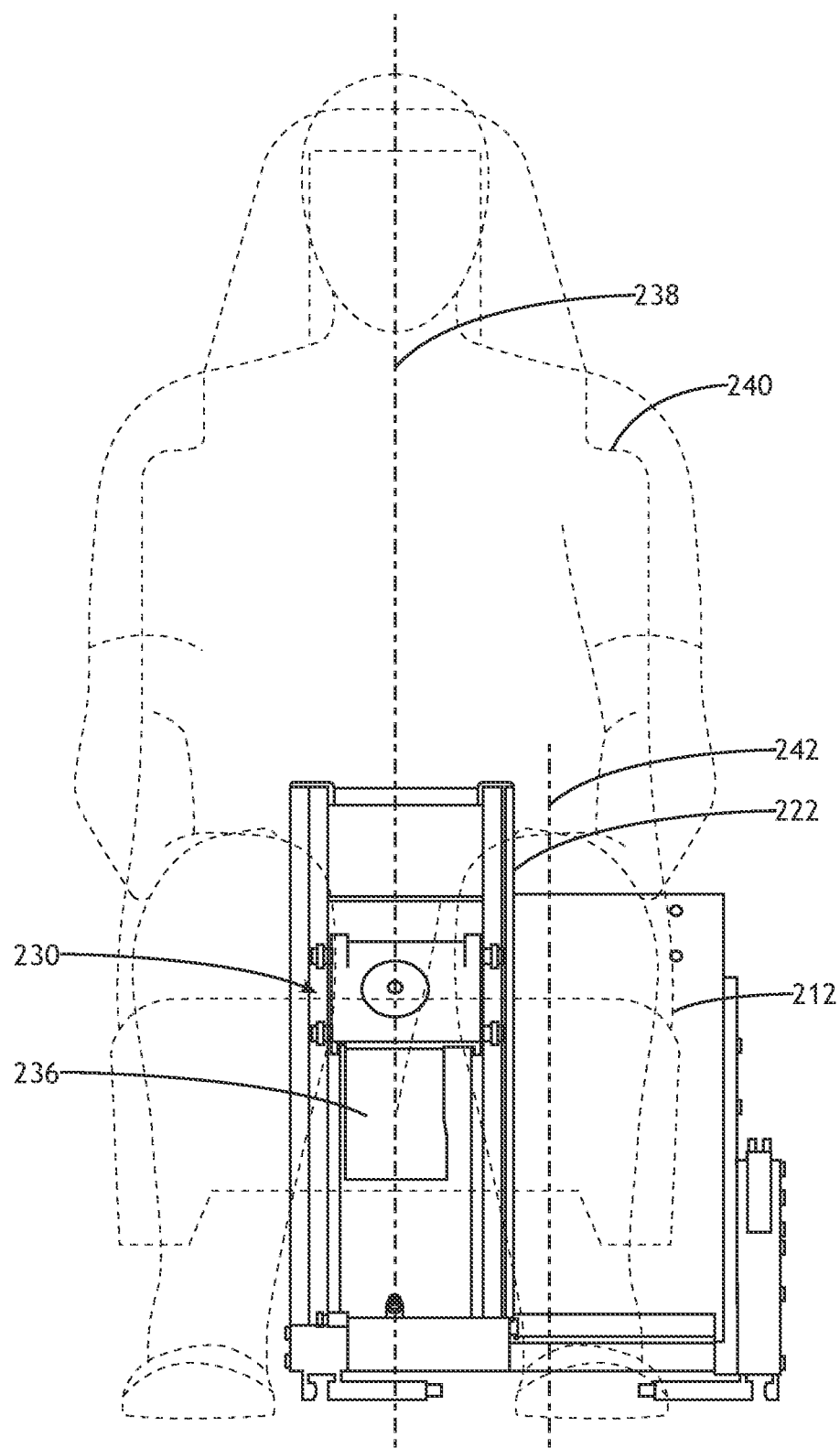
FIG. 4 is a front view of the pilot seat of FIG. 3B illustrating the centerline common to the occupant, seat bucket and singular motion controller.

FIG. 4 illustrates the relative positions of the seat components with respect to each other and to the occupant. Line 238 illustrates the centerline of the occupant 240, which also coincides with the centerline of the seat bucket 212. The motion controller 230 is substantially centered relative to the seat bucket 212 and therefore also substantially centered relative to the occupant 240. In some embodiments, the motion controller 230 is nearly centered relative to the centerline 238 while the energy absorber 236 is centered relative to the centerline 238 such that the energy absorber is uniformly loaded to eliminate binding. The centerline 238 is offset (i.e., laterally shifted) relative to the centerline of the seat base illustrated at 242. In some embodiments, the third stanchion 222 is further offset (i.e., laterally shifted) relative to the seat base centerline 242.

Figure 5:
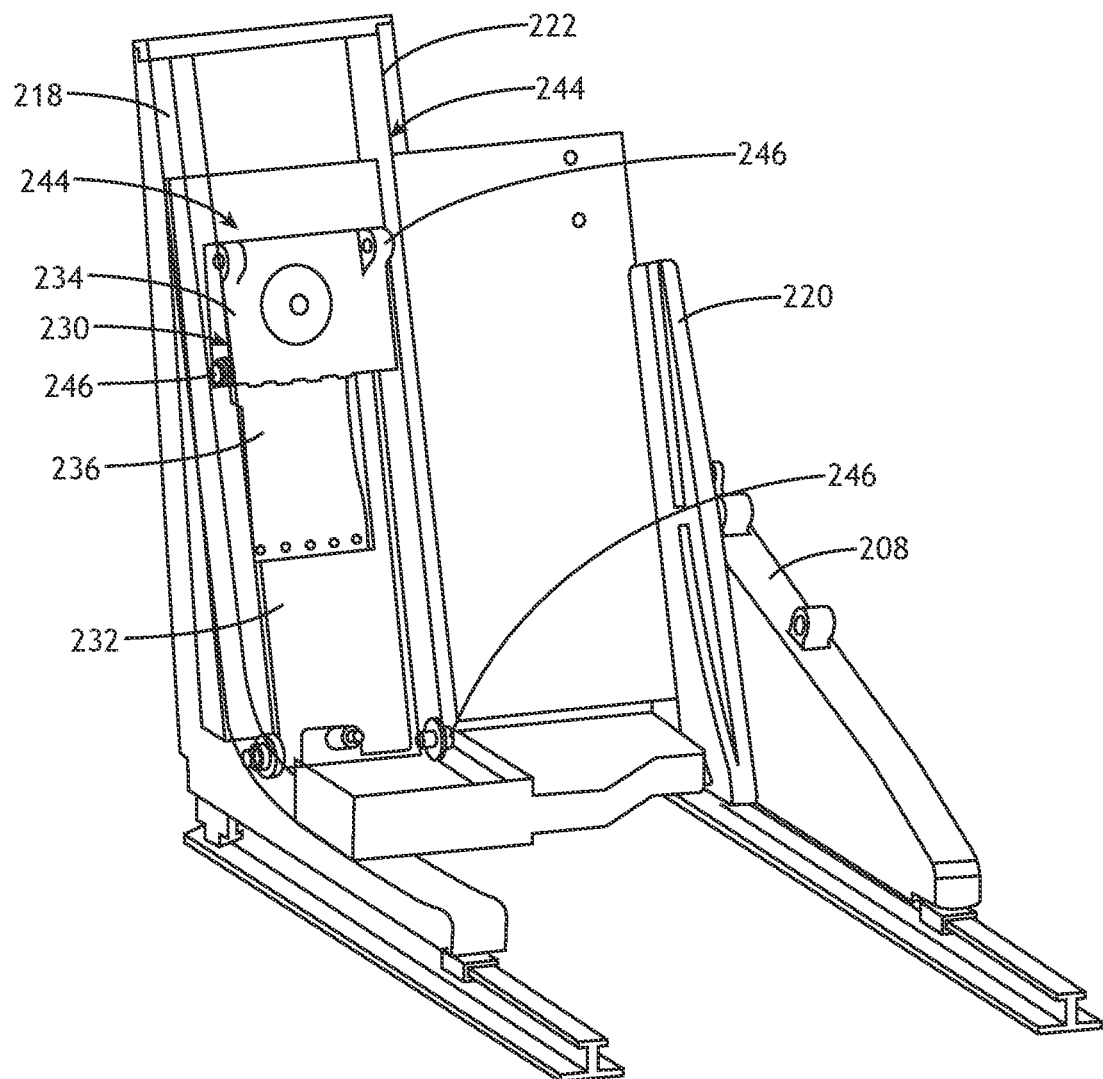
FIG. 5 is a front isometric view the seat base and singular motion controller of FIG. 3B shown in an assembled state.

FIG. 5 illustrates the seat base 208 and motion controller 230 components of the seat in an assembled state. Each of the first and third stanchions 218, 222 includes or forms on an inboard (i.e., facing) side thereof a roller channel 244 configured to receive and define a motion path of the motion controller 230. In some embodiments, the motion path includes linear motion. In some embodiments, the motion path includes combined linear and rotational motion, occurring simultaneously or sequentially. The motion controller 230 generally includes the carrier assembly 232 and the carriage assembly 234 interconnected by the energy absorber 236. Each of the carrier assembly 232 and the carriage assembly 234 carry vertically oriented rollers 246 configured to engage in and roll along the roller channels 244. In some embodiments, the carrier assembly 232 includes a pair of laterally opposed rollers 246 and the carriage assembly includes two pairs of laterally opposed rollers 246. The rollers 246 function to facilitate smooth movement of the carrier assembly 232 and carriage assembly 234 relative to the seat base 208.

Figure 6:
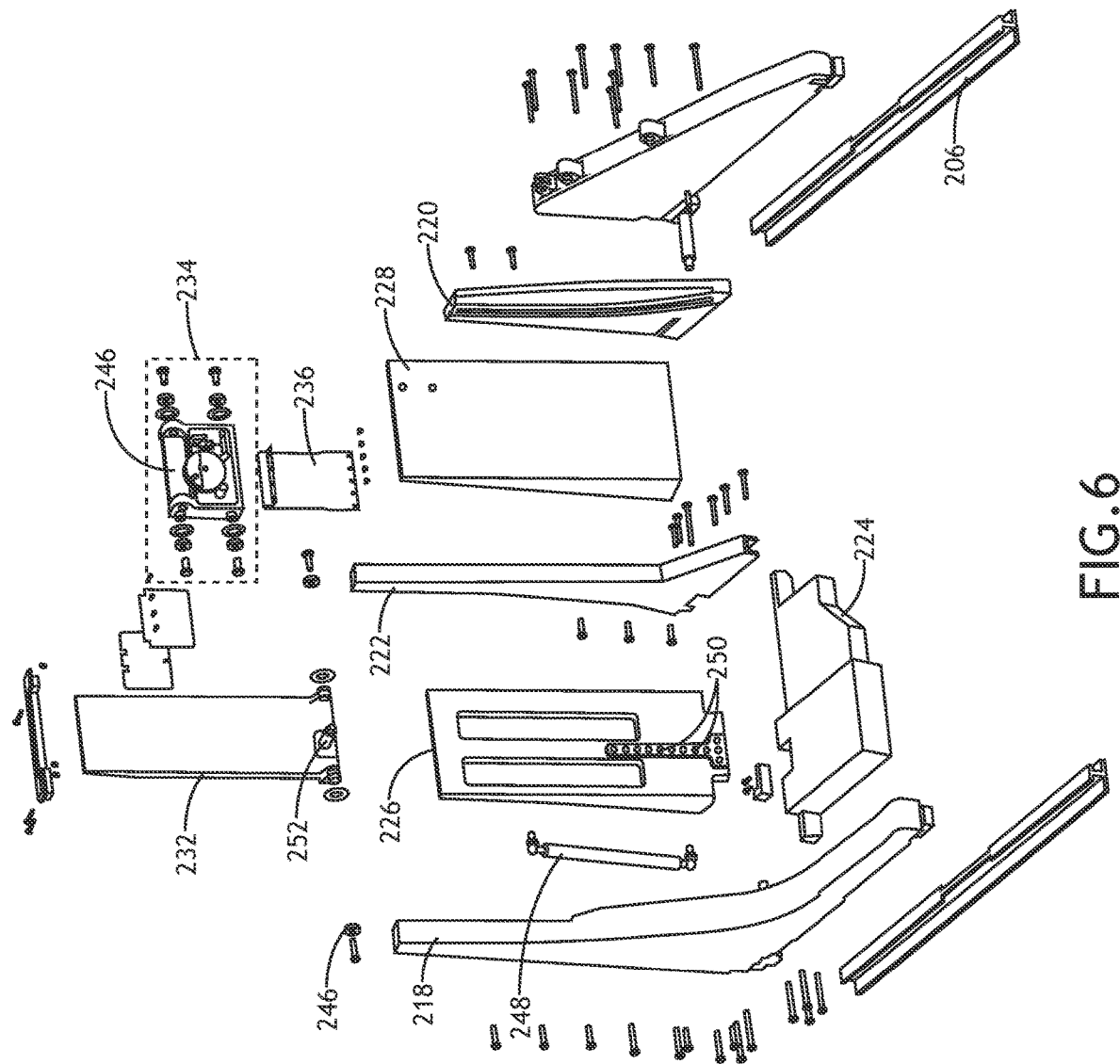
FIG. 6 is a front isometric view of the seat base and singular motion controller of FIG. 5 shown in an exploded state.

FIG. 6 illustrates the seat base 208 and motion controller 230 in an exploded state and indicates the components described above. Components may be attached or otherwise connected using the hardware illustrated or other fasteners. The seat may further include a gas spring 248 coupled between the seat base 208 and the motion controller 230, and in a particular embodiment coupled at one end to the seat base 208 and at an opposing end to the carrier assembly 232. In use, the gas spring 248 or like device operates to provide lift assistance to the carrier assembly 232 for vertical seat bucket adjustment as well as dampen freefall motion of the seat bucket.

Further illustrated in FIG. 6 is a seat bucket height adjustment mechanism that interacts between the carrier assembly 232 and the seat base 208. In some embodiments, the first transverse spreader 226 includes a plurality of spaced apart and vertically aligned metering holes 250 and the carrier assembly 232 includes a spring-loaded pin 252.

In use, the spring-loaded pin 252, which may be actuated via a translating Bowden cable or like mechanism, is received in one of the metered openings 250 at a time to lock the vertical position of the seat bucket. To change the seat position, the pin is pulled to withdraw the pin from one of the metered openings 250, the seat bucket is moved to a different vertical position, and the pin is released and settles into the aligned opening to lock the seat bucket height.

Figure 7:
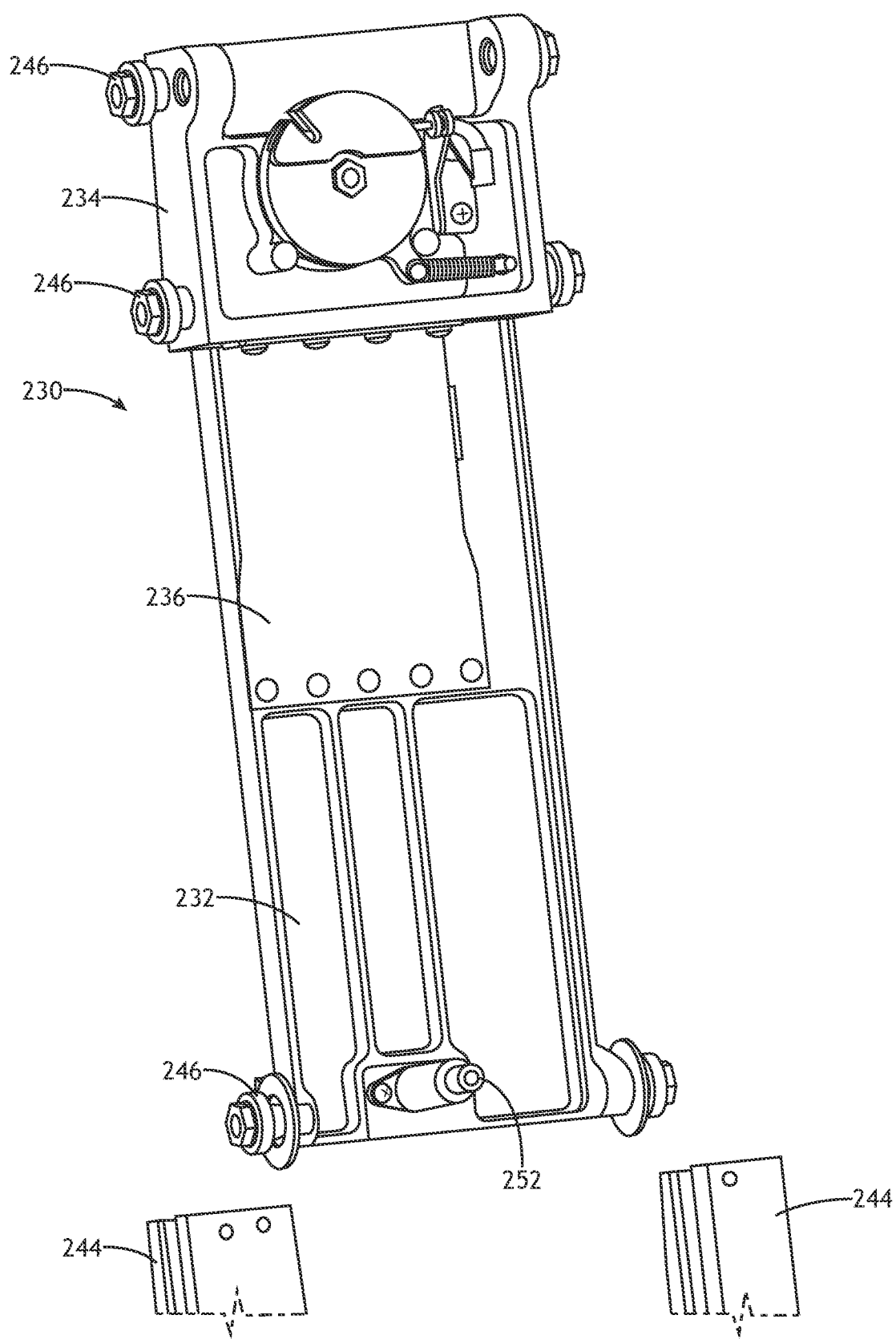
FIG. 7 is a front isometric view of the singular motion controller, in accordance with an embodiment of this disclosure.

FIG. 7 illustrates the motion controller 230 according to an embodiment of the present disclosure. The motion controller 230 generally includes the carrier assembly 232, the carriage assembly 234, and the energy absorber 236 coupling the two assemblies 232, 234. The carrier assembly 232 carries the laterally opposed pair of rollers 246 and the carriage assembly 234 carries the laterally opposed pairs of rollers 246. FIG. 7 further illustrates the roller channels 244 configured to receive and guide the rollers 246. The roller channels 244 further define the motion path of the motion controller 230, which may be linear or a combination of linear and rotational motion.

During normal use of the seat (i.e., below threshold g-force events, normal turbulence, normal wind gust loads, etc.) the energy absorber 236 maintains a constant positional relationship between the carrier assembly 232 and the carriage assembly 234 such that the two assemblies translate up and down together as a single unit relative to the seat base 208, for example, during seat adjustment. In other words, during normal use, the energy absorber 236 resists deformation. During a dynamic event, such as during a high g-force event of sufficient magnitude (e.g., exceeding 12G or 16G), the energy absorber deforms to attenuate the high load on the seat bucket. For example, responsive to a force of sufficient magnitude, the energy absorber folds over itself thereby allowing relative motion between the carrier assembly 232 and the carriage assembly 234. In some embodiments, the energy absorber 236 includes a stainless-steel sheet including an introduced fold, wherein the carriage assembly 234 moves downward relative to the carrier assembly 232 as the energy absorber 236 continues to fold over itself.

With continued reference to FIG. 7, the carrier assembly 232 includes the spring-loaded pin 252 positioned proximate the bottom end of the carrier assembly, providing a single lockout for the seat bucket position.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A rotorcraft pilot seat, comprising:
a seat base attachable to floor tracks;
a seat bucket positioned laterally offset relative to a centerline of the seat base; and
a singular motion controller movably coupling the seat bucket to the seat base, wherein the singular motion controller is centered relative to the seat bucket and laterally offset relative to the seat base;
wherein the seat base comprises:
spaced first and second vertical stanchions;
a third vertical stanchion positioned between the first and second vertical stanchions;
a first transverse spreader coupled to each of the first and third vertical stanchions;
a second transverse spreader coupled to each of the second and third vertical stanchions; and
a transverse floor pan coupled to each of the transverse spreader and the first, second and third vertical stanchions;
wherein at least the first and third vertical stanchions include a roller channel defining a motion path of the seat bucket.

2. The rotorcraft pilot seat according to claim 1, wherein the singular motion controller comprises:
a carrier assembly positioned between and movably coupled to the first and third stanchions;
a carriage assembly coupled to the seat bucket; and
an energy absorber coupled between the carrier assembly and the carriage assembly;
wherein during normal use of the seat, the energy absorber prevents relative motion between the carrier assembly and the carriage assembly, and during a dynamic event of sufficient magnitude the energy absorber permits relative motion between the carrier assembly and the carriage assembly.

3. The rotorcraft pilot seat according to claim 2, wherein:
the carrier assembly includes vertically oriented rollers engaged in and configured to roll along the roller channels of the first and third stanchions; and
the carriage assembly includes vertically oriented rollers engaged in and configured to roll along the roller channels of the first and third stanchions.

4. The rotorcraft pilot seat according to claim 2, wherein each of the carrier assembly and the carriage assembly is centered relative to the seat bucket.

5. The rotorcraft pilot seat according to claim 2, further comprising a gas spring coupled between the carrier assembly and the seat base, the gas spring operative to provide a lifting force on the carrier assembly and dampen downward motion of the carrier assembly relative to the seat base.

6. The rotorcraft pilot seat according to claim 1, wherein the motion path of the seat bucket includes at least one of linear motion and rotational motion.

7. The rotorcraft pilot seat according to claim 1, wherein:
the first transverse spreader comprises a plurality of spaced apart and vertically aligned metering holes; and
the carrier assembly carries a spring-loaded pin configured to be received in one of the plurality of metering holes at a time to lock a vertical position of the carrier assembly relative to the seat base.

8. A rotorcraft cockpit configuration, comprising:
a floor defining a well configured to receive retracted landing gear;
a pilot seat attached to the floor and positioned on a first lateral side of the well; and
a copilot seat attached to the floor and positioned on a second lateral side of the well;
wherein each of the pilot seat and the copilot seat comprises:
a seat base attached to the floor;
a seat bucket positioned laterally offset relative to a centerline of the seat base; and
a singular motion controller movably coupling the seat bucket to the seat base, wherein the singular motion controller is centered relative to the seat bucket and laterally offset relative to the seat base;
wherein the seat base comprises:

spaced first and second vertical stanchions each attached to a floor track positioned in the floor;

a third vertical stanchion positioned between the first and second vertical stanchions, the third vertical stanchion detached from the floor;

a first transverse spreader coupled to each of the first and third vertical stanchions;

a second transverse spreader coupled to each of the second and third vertical stanchions; and a transverse floor pan coupled to each of the transverse spreader and the first, second and third vertical stanchions;

wherein at least the first and third vertical stanchions include a roller channel defining a motion path of the seat bucket.

9. The rotorcraft cockpit configuration according to claim 8, wherein the singular motion controller comprises:

a carrier assembly positioned between and movably coupled to the first and third stanchions;

a carriage assembly coupled to the seat bucket; and an energy absorber coupled between the carrier assembly and the carriage assembly;

wherein during normal use of the seat, the energy absorber prevents relative motion between the carrier assembly and the carriage assembly, and during a dynamic event of sufficient magnitude the energy absorber permits relative motion between the carrier assembly and the carriage assembly.

10. The rotorcraft cockpit configuration according to claim 9, wherein:

the carrier assembly includes vertically oriented rollers engaged in and configured to roll along the roller channels of the first and third stanchions; and the carriage assembly includes vertically oriented rollers engaged in and configured to roll along the roller channels of the first and third stanchions.

11. The rotorcraft cockpit configuration according to claim 9, wherein each of the carrier assembly and the carriage assembly is centered relative to the seat bucket, and wherein the pilot seat and the copilot seat are offset in opposite directions.

12. The rotorcraft cockpit configuration according to claim 8, wherein the motion path of the seat bucket includes at least one of linear motion and rotational motion.

13. The rotorcraft cockpit according to claim 8, wherein:

the transverse spreader comprises a plurality of spaced apart and vertically aligned metering holes; and the carrier assembly carries a spring-loaded pin configured to be received in one of the plurality of metering holes at a time to lock a vertical position of the carrier assembly relative to the seat base.

\* \* \* \* \*